June 19, 1934.  A. J. SMITH  1,963,763
METHOD OF AND APPARATUS FOR SUPPLYING MOLTEN GLASS
Filed Nov. 5, 1931   3 Sheets-Sheet 1
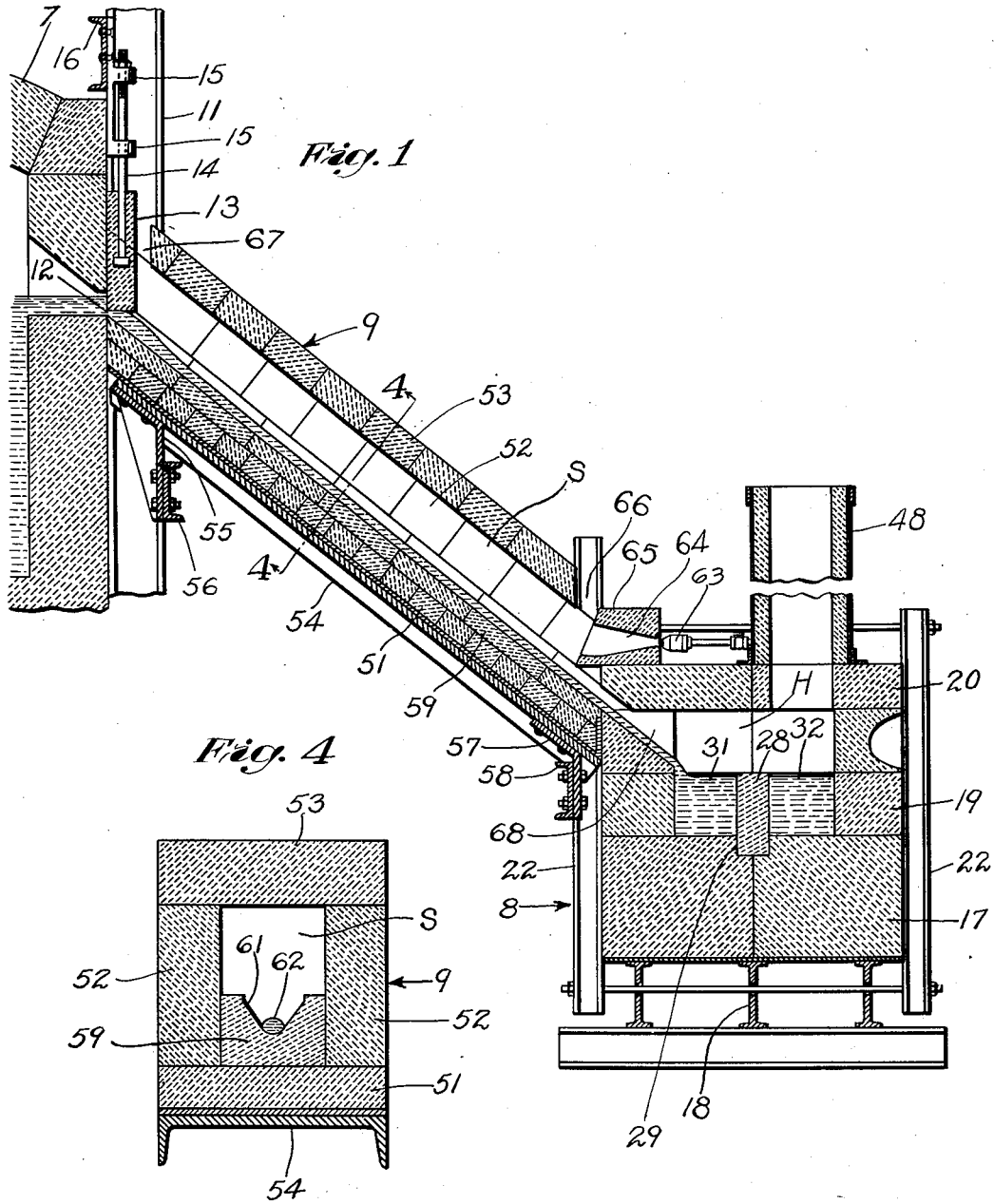

June 19, 1934.  A. J. SMITH  1,963,763
METHOD OF AND APPARATUS FOR SUPPLYING MOLTEN GLASS
Filed Nov. 5, 1931   3 Sheets-Sheet 2
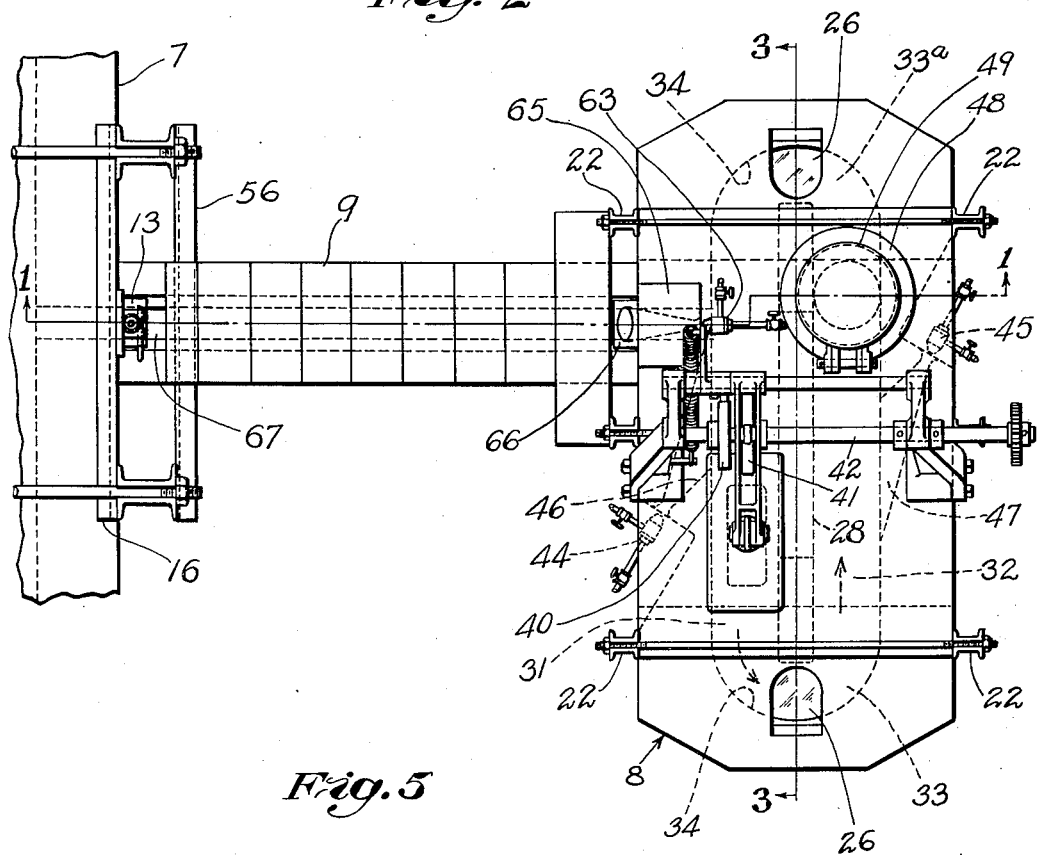
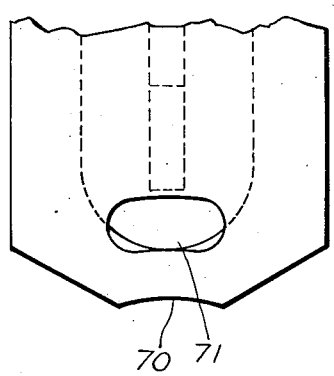
Witness:
W. B. Thayer
Inventor;
Algy J. Smith
by Brown & Parham
Attorneys June 19, 1934.   A. J. SMITH   1,963,763
METHOD OF AND APPARATUS FOR SUPPLYING MOLTEN GLASS
Filed Nov. 5, 1931   3 Sheets-Sheet 3

Witness;
W. B. Thayer

Inventor
Algy J. Smith
by Brown & Parham
Attorneys

Patented June 19, 1934

1,963,763

UNITED STATES PATENT OFFICE 1,963,763

METHOD OF AND APPARATUS FOR SUPPLYING MOLTEN GLASS

Algy J. Smith, Bloomfield, Conn., assignor to Hartford-Empire Company, Hartford, Conn., a corporation of Delaware Application November 5, 1931, Serial No. 573,160

13 Claims. (Cl. 49—56)

This invention relates to methods of and apparatus for supplying molten glass, and has particular relation to such methods and apparatus for providing a pool of glass from the surface of which charges of glass may be gathered in the molds of a forming machine by suction.

The maintenance of a pool of glass at a suitable temperature and of the proper uniformity for suction gathering not only is attended by the usual difficulties arising from the peculiar characteristics of molten glass, but also by the problem of disposing of the chilled bits or tails of glass which are formed by the gathering of the charges and which fall back in the pool when they are severed from the charges. The glass also is chilled in spots where the relatively cool molds contact with its surface during gathering operations.

It is the general object of this invention to provide a novel method and novel apparatus by the employment of which the difficulties of maintaining a gathering pool in the desired condition may be overcome in an efficient manner.

Another object of this invention is to provide a novel stationary container for a gathering pool which may be located at an appreciably lower level than the level of the tank which supplies glass thereto.

A further object of the invention is to provide a novel stationary container for a pool of molten glass which may be located more or less remotely from the tank which supplies glass thereto, and in which the glass may be circulated, and heated during circulation, in such a way as to maintain it in the desired condition for gathering by the molds of one or more suction machines.

A more specific object of the invention is to provide a novel stationary container for a pool of glass, which container is located at a distance from and at an appreciably lower level than the tank from which glass is supplied to the container, the glass preferably being conducted from the tank to the container through a downwardly inclined conduit of novel construction.

Such an arrangement has numerous advantages. It makes it unnecessary to raise the suction machine as by mounting it on a platform, where the tank level is too high above the level of the factory floor. It also makes it impossible for chilled glass to pass from the gathering pool into the tank which might cause undesirable contamination and/or devitrification of glass in the tank, spoiling the glass discharged from the tank into a feeder forehearth or into another container for a gathering pool. Furthermore, such isolation of the gathering pool from the glass in the tank permits circulation of the glass in the pool with increased safety and makes the maintenance of the glass in the pool at the desired temperature easier because the pool may be heated wholly independently of the heating of the glass in the tank.

Other objects of the invention will be pointed out in the detailed description which follows, or will become apparent from such description.

In order that the invention may more readily be understood and its various advantages appreciated, reference should be had to the accompanying drawings, in which an embodiment thereof is illustrated.

In said drawings:

Figure 1 is a view in vertical section of apparatus embodying the invention, taken on the line 1—1 of Fig. 2;

Fig. 2 is a view on top plan of the construction of Fig. 1;

Fig. 4 is a view in transverse section of the conduit between the tank and container; and Fig. 5 is a partial view in top plan of a modification of the container shown in Fig. 2.

Figure 3:
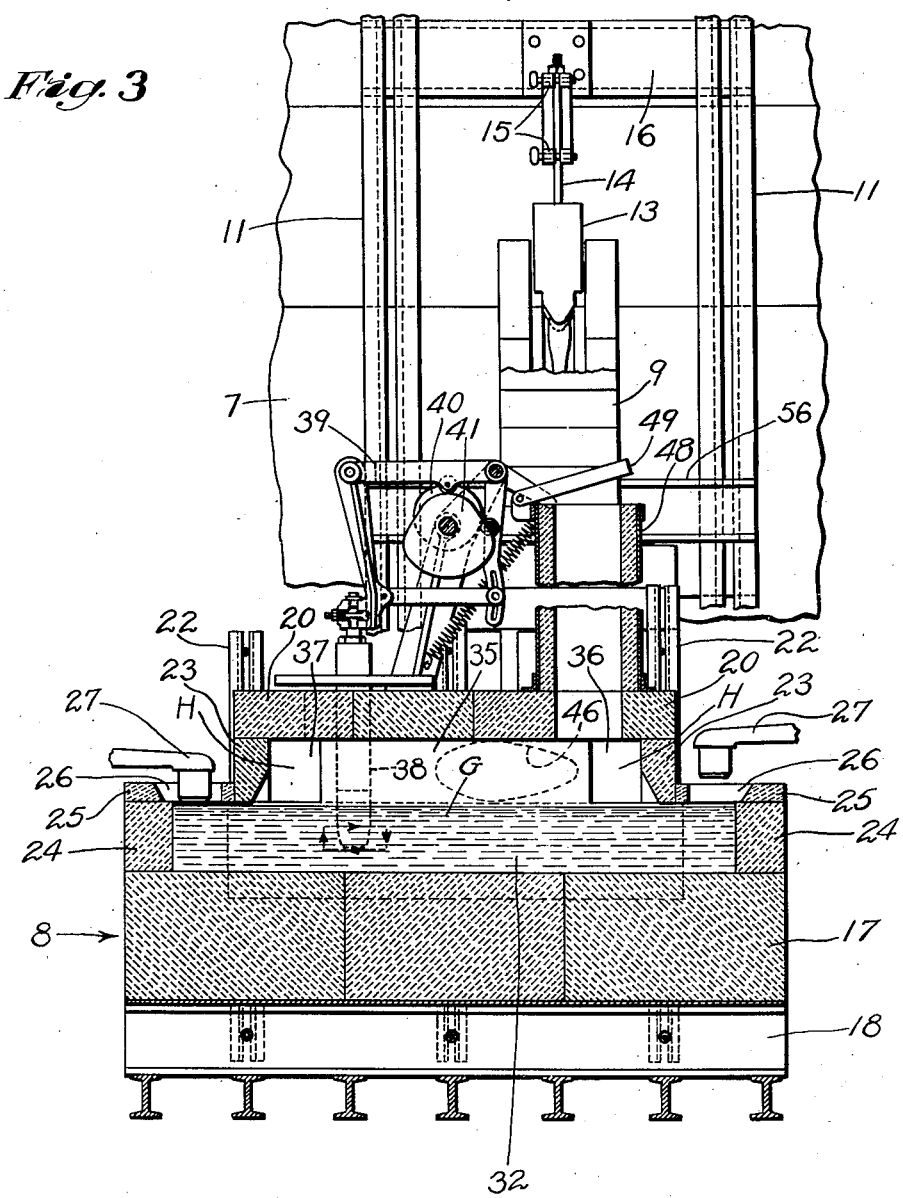
Fig. 3 is a view in vertical longitudinal section of the gathering pool container shown in Figs. 1 and 2, said view being taken on the line 3—3 of Fig. 2.

Considering the drawings in detail, the front portion of a glass melting tank is shown at 7, the stationary container for the gathering pool at 8, and the conduit for the supply of glass from the tank to the container at 9. The container 8 may be at an appreciably lower level than tank 7 and the conduit 9 inclined downwardly accordingly, as illustrated. The container also may be spaced at a considerable distance from the tank, provided of course that conduit 9 is made sufficiently long.

It may be desired to supply glass to a suction machine from a tank which previously has been used exclusively for supplying glass to feeder foreheaths, which have to be supported quite a distance from the floor of the factory. The above-described arrangement affords a simple means for supplying glass to a suction machine under such circumstances, because container 8 may be positioned on the floor of the factory at such a level as to permit the suction machine to operate without being supported by a platform or the like especially provided to raise its level.

The tank 7 comprises the usual buck-stays 11 and has a discharge opening 12 through which glass flows into conduit 9 at a rate dependent upon the setting of gate 13 and the viscosity of the glass. This gate is supported by rod 14 adjustable in screw clamps 15 carried by crosspiece 16 between buck-stays 11.

The container 8 preferably is of elongate shape, being formed of bottom blocks 17 resting on I-beams 18, side wall blocks 19, and top cover blocks 20. These blocks are held in place by buck-stays 22.

The endmost top cover blocks 20 rest on transverse upper end wall blocks 23 of a heating chamber H, blocks 23 being set in from the ends of the container beyond where the lower end wall blocks 24 of the glass chamber rest on the outer ends of bottom blocks 17. These blocks 24 define the ends of the gathering pool G, and resting thereon are cover plates 25 having openings 26 through which the molds 27 of intermittent suction machines may be projected to gather charges of glass from the surface of pool G. It will be seen that the location of blocks 23 inwardly of the ends of the container provides clearances for the molds 27, permitting them to be dipped into the glass with a minimum of vertical movement.

The interior of the container is divided by a longitudinally extending central web or wall 28, the ends of which are spaced from the inner sides of blocks 24. This wall preferably is set in a slot 29 (Fig. 1) formed in bottom blocks 17, so that no horizontal joint is exposed to the glass.

The wall thus divides the pool into spaced elongate channels 31 and 32, the ends of which are connected by curved channels 33 and 33—a formed between the inner semi-circular curved faces 34 of end blocks 24 and the ends of web 28, and over which the gathering openings 26 in plates 25 are located. These channels constitute an endless passageway for the glass of pool G.

In order to divide heating chamber H, web 28 is extended to the cover blocks 20 which it supports at their centers, this extension being indicated at 35. This extension is cut away at its ends as indicated at 36 and 37, so that gases of combustion may flow in an endless path from above channel 31 into the space above channel 32, and from above channel 32 into the space above chanenl 31.

Forced circulation of the glass in its endless passageway may be effected by any suitable means, such as a paddle 38 which may dip constantly in the glass. This paddle may be supported for movement in either of the channels 31 or 32, being located in the former in the illustrated embodiment of the invention.

The paddle may be supported and actuated by linkage designated generally at 39, which has operative connections with cams 40 and 41 on drive shaft 42. By means of this arrangement, the glass contacting portion of the paddle may be moved in a vertical rectangular path, as shown by the arrows in Fig. 3, and more rapidly on its lower horizontal stroke than on its upper horizontal stroke. Consequently, the glass is circulated through channel 31 toward channel 33, then through chanenl 32 to channel 33—a and back into channel 31, as indicated by the dash arrows in Fig. 2. The purpose of maintaining the implement in contact with the glass at all times is to prevent introduction of air bubbles into the glass.

The glass circulating mechanism per se forms no part of this invention, and is substantially identical with a circulating mechanism disclosed and claimed in the patent to Karl E. Peiler, No. 1,721,487, granted July 16, 1929.

In order to maintain the glass in pool G at the desired temperature and in uniform condition, heat may be applied thereto by burners 44 and 45, the flames of which are directed through ports 46 and 47 opening into chamber H above channels 31 and 32 respectively. Preferably ports 46 and 47 make acute angles with the side walls of the container, so that the flame of burner 44 is directed toward channel 33—a and that of burner 45 toward channel 33. Therefore, the gases of combustion may be caused to flow through heating chamber H in a direction opposite to that in which the glass is circulated by paddle 38, and so that the glass is heated as it moves away from one gathering zone to prepare it for gathering at the next gathering zone.

The circulation of the gases of combustion is assisted by stack 48 in the roof of the container, which stack may be located above channel 32 between burner port 47 and channel 33—a, as illustrated in Fig. 2. Stack 48 may be provided with a damper 49 by means of which the draft through the stack and the circulation of gases through chamber H may be regulated. It will be understood that burners 44 and 45 and damper 49 may be appropriately adjusted to maintain the desired temperature conditions in the container 8.

The conduit 9 may be constructed in the form of an elongate box comprising bottom blocks 51, side wall blocks 52, and cover blocks 53. This box-like structure may be supported by a channel iron 54, connected at its upper end to bracket 55 on cross-piece 56 on tank buck-stays 11, and at its lower end to bracket 57 secured to cross-piece 58 mounted on buck-stays 22 of container 8.

Contained within this structure are channel blocks 59 which rest on bottom blocks 51. These channel blocks only partially fill the interior of the structure and leave a heating space S therein. Blocks 59 preferably have a V-shaped channel formed therein as indicated at 61, to confine the glass flowing therethrough to a relatively thin and narrow stream as shown at 62, and as later explained.

This stream of glass may be tempered as it flows through conduit 9 by the application of heat thereto. To this end, a burner 63 may be supported on container 8, the flame of which burner is directed through a port 64 of burner block 65 into and upwardly through heating space S. This space S may have openings 66 and 67 at its lower and upper ends respectively for the admission of air to support combustion and to create a draft in space S.

The discharge end of conduit 9 preferably is connected to container 8 between burner port 46 and channel 33—a, a V-shaped inlet port 68 being formed in the side wall of the container to receive the thin stream of glass. Thus the incoming glass may be heated by burner 44, and the fresh glass impelled toward channel 33 by paddle 38. Moreover, the incoming glass mixes with the glass flowing into channel 31 from channel 33—a and assists in raising its temperature and increasing its uniformity.

However, it will be understood that conduit 9 may be connected to the container at any other point as may be desirable or convenient.

If it is desired to supply glass to a continuously rotating suction machine, either or both ends of the container may be modified as illustrated in Fig. 5. In this form of container, the end thereof is made arcuate as indicated at 70 and an arcuate slot 71 provided in the end cover through which continuously moving molds may be projected to gather charges.

The preferred mode of performing the novel method of the invention by the employment of the above-described novel apparatus is as follows:

The gate 13 associated with tank 7 is adjusted so that a thin stream of glass flows downwardly through conduit 9 into container 8 to provide pool G therein, and at a rate sufficient to maintain the level of the pool at a fixed height and to supply the necessary amount of glass to the molds.

This stream preferably is caused to assume a form as thin and as narrow as possible in order to permit it to be tempered by heat in heating space S. The application of heat to the stream may serve to remove bubbles from the glass, in addition to maintaining it at a desirably high temperature.

Furthermore, the cross-sectional form of the stream is such as to prevent air from being entrapped therein as it flows through conduit 9.

Preferably, at least the bottom side of the stream is caused to remain in contact with the channel through which it flows, from the time it leaves the opening 12 in tank 7 until it enters pool G, the channel being suitably formed to this end. This further prevents air being entrapped in the glass, as would be the case if the stream were permitted to drop without support into the pool G while exposed on all sides to the surrounding atmosphere.

The stream of glass may be maintained in a very hot condition so that a large quantity of glass may be supplied to the container while the stream is kept quite small in cross-section. In fact, the stream 62 may be a great deal hotter than the glass in pool G.

The stream of supply glass enters the pool and mingles freely with the glass which is being circulated by paddle 38 in a counterclockwise direction looking at Fig. 2, and is being heated by gases of combustion circulating in the opposite or clockwise direction.

If the stream is materially hotter than the glass in the pool, as is preferred, the chilled glass, which is formed in channel 33—a by the gathering of glass from said channel, will be reheated by the incoming glass and assimilated thereby. This action is assisted by heat from burner 44, the flame of which plays on the glass flowing from channel 33—a into channel 31 near where the supply stream enters. It is further assisted by the mixing of the glass by paddle 38.

It will be observed that the glass travels a relatively long path in flowing from the gathering zone in channel 33—a through channel 31 to the gathering zone in channel 33, and an equally long path from the latter to the former through channel 32. This gives ample opportunity for the reheating and uniformizing of the glass between the gathering zones by burners 44 and 45, which act on the glass as it flows away from the respective zones, and which burners augment the heating action of each other. At the same time, it is impossible for glass to be returned to the tank from the container.

It is to be understood that the above-described method and apparatus may be varied without departing from the scope of the appended claims. For example, one of the gathering openings may be omitted; the location of the burners and the inlet for the supply stream may be changed; a different type of glass circulator may be used; and the direction of circulation of either the glass or gases of combustion, or both, may be reversed; and such other changes made as would occur to one skilled in the art.

Having thus described my invention, what I desire to claim and secure by Letters Patent is:

1. The method of supplying glass to a stationary pool from the surface of which mold charges of glass are gathered, which comprises conducting a thin narrow stream of glass from a melting tank downwardly through a channel into a container for said pool, tempering the stream of glass as it flows from the tank to the pool by heating the stream, and maintaining the stream in contact with the channel throughout its entire length from the tank to the pool.

2. Apparatus for supplying glass to a stationary pool from the surface of which mold charges of glass may be gathered, comprising a melting tank, a stationary container for the pool, means forming an inclined channel for conducting a thin stream of glass from the melting tank downwardly through the channel into said container, and means for tempering the glass as it flows through said channel by causing gases of combustion to flow in contact therewith in an upwardly inclined stream, said channel being so constructed and arranged as to prevent exposure of at least one side of said stream throughout its entire length from the tank to the pool to avoid the introduction of bubbles into said pool by said stream.

3. The method of supplying glass to a stationary gathering pool and conditioning the glass in said pool, which comprises conducting a narrow stream of glass from a melting tank downwardly through a channel into a container for the pool, heating the stream to temper the glass and to maintain it in a relatively hot condition, mechanically circulating the glass in the pool and with respect to the pool walls in a closed orbital path toward and away from a gathering zone, and introducing the stream of hot glass into the pool from above the level of the pool at a point in said path beyond the gathering zone to reheat the chilled glass formed in said gathering zone as it flows away from said zone.

4. The method of supplying glass to a gathering pool and conditioning the glass therein, which comprises conducting a stream of glass from a melting tank downwardly to a container for the pool, introducing the stream into the pool from above the level of the pool, preventing exposure of at least one side of said stream throughout its entire length of its travel from the tank to the pool to avoid the introduction of bubbles into the pool by said stream, and circulating the glass in the pool in a closed orbital path by moving an implement therein, which implement is constantly maintained in contact with the glass in the pool to prevent introduction of bubbles into the pool by said implement.

5. The method of maintaining and conditioning a pool of molten glass from the surface of which mold charges of glass are gathered in a gathering zone, which comprises circulating the glass in one direction in a closed path having elongate sides which lead toward and away from the gathering zone, directing gases of combustion into contact with the glass as it circulates toward and away from the gathering zone, and circulating such gases in a closed path above the glass in a direction opposite to the direction in which the glass is circulated.

6. The method of maintaining and conditioning a pool of molten glass from the surface of which mold charges are gathered in a plurality of gathering zones, which comprises circulating the glass in the endless path having elongate sides between the ends of which the gathering zones are located, heating the glass as it moves away from each gathering zone and along the elongate sides of the path, and introducing a stream of supply glass into the pool at a point between said gathering zones.

7. In combination with a glass melting tank located at a high level, a stationary container for a pool of glass from the surface of which mold charges are gathered, said container being located at a low level relative to the tank and being spaced therefrom, a discharge opening in the tank, an inlet opening in the container, and a conduit inclined downwardly from said tank to said container, said conduit being directly connected at its ends to said tank and said container and having a channel therein forming with the walls of said inlet opening a continuous passageway in contact with the glass stream for the entire length of its travel from the tank to the pool, whereby to avoid the introduction of bubbles into the pool by the stream of glass flowing thereinto.

8. In combination with a glass melting tank located at a high level, a stationary container for a pool of molten glass located at a low level and spaced from said tank, said tank having a glass outlet and said container a glass inlet, a conduit extending downwardly from said tank to said container, the ends of said conduit being directly connected to said tank and said container, said conduit having a glass conducting channel formed therein, the ends of which are directly connected to said outlet and inlet and form therewith a continuous passageway in contact with the glass stream for the entire length of its travel from the tank into the pool, a heating chamber in said conduit located above said channel, and means for heating said chamber to temper glass flowing downwardly through said channel.

9. In combination with a glass melting tank located at a high level, a stationary container for a pool of glass located at a low level and spaced from said tank, said tank having a glass outlet and said container a glass inlet, a conduit extending downwardly from said tank to said container, said conduit having a V-shaped glass conducting channel therein directly connected at its upper and lower ends with said outlet and inlet respectively and forming with said outlet and said inlet a continuous passageway in contact with the glass stream for the entire length of its travel from the tank into the pool, a heating chamber in said conduit extending between the ends thereof above said channel, and means for directing gases of combustion upwardly through said chamber to temper glass flowing downwardly through said channel.

10. A stationary container for a pool of molten glass, said container being of elongate shape and having an elongate glass chamber therein, a wall extending longitudinally through said chamber to form an endless glass passageway having spaced elongate sides, an opening formed in said container between the ends thereof for the supply of molten glass to said passageway from above the lever of the glass in the container, and means for circulating the glass in said container in an endless path through said passageway and entirely in said container, said container having an opening adjacent one of its ends for access to the surface of the glass therein.

11. A container for a pool of molten glass, said container being of elongate shape and having an elongate chamber formed therein, an opening in said container between the ends thereof for the supply of molten glass to said chamber, a wall extending longitudinally of said chamber to form an endless glass passageway therein, a heating chamber in said container above the glass passageway, and means for heating said chamber, said wall being extended upwardly through said heating chamber to provide an endless passageway for the circulation of heat in an endless path in said container.

12. A container for a pool of molten glass from the surface of which mold charges are gathered, comprising side walls and end walls forming a glass chamber in said container, a wall extending longitudinally of said chamber, the ends of which are spaced from said end walls, said wall forming an endless passageway in said container, openings in said container opposite the ends of said wall for access to the glass in gathering zones adjacent said end walls, burner ports in said side walls and extending at an angle thereto toward said gathering zones, burners for directing flames through said ports, and a glass supply inlet in one of said side walls.

13. A container for a pool of molten glass comprising side walls and end walls forming the glass chamber in said container, a wall extending longitudinally through said chamber, the ends of which are spaced from said end walls, said wall forming an endless passageway having elongate sides, openings in said container opposite the ends of said wall for access to the glass in gathering zones between the ends of said wall and the inner sides of said end walls, a heating chamber formed above said glass chamber, said wall being extended upwardly to the top of said heating chamber and having openings formed therein at the ends of said heating chamber, to form elongate heating spaces above the elongate sides of said glass passageway, burner ports extending into said spaces at acute angles to the side walls of said container, said ports being pointed toward the gathering zones, burners for directing flames through said ports toward said gathering zones, a stack for said heating chamber, an inlet for glass formed in a side wall of said container above the glass level therein, and means for circulating the glass in the glass passageway toward and away from said gathering zones.

ALGY J. SMITH.